US 9,827,706 B2

(12) United States Patent
Callaway, III

(10) Patent No.: US 9,827,706 B2
(45) Date of Patent: Nov. 28, 2017

(54) MOBILE WATERSTOP WELDING APPARATUS

(71) Applicant: William S. Callaway, III, Escalante, UT (US)

(72) Inventor: William S. Callaway, III, Escalante, UT (US)

( * ) Notice: Subject to any disclaimer, the term of this patent is extended or adjusted under 35 U.S.C. 154(b) by 0 days.

(21) Appl. No.: 15/176,288

(22) Filed: Jun. 8, 2016

(65) Prior Publication Data

US 2016/0281350 A1 Sep. 29, 2016

Related U.S. Application Data

(63) Continuation-in-part of application No. 14/100,097, filed on Dec. 9, 2013, now abandoned.

(51) Int. Cl.
*B29C 65/20* (2006.01)
*E04B 1/68* (2006.01)
(Continued)

(52) U.S. Cl.
CPC ............ *B29C 65/02* (2013.01); *B23K 20/008* (2013.01); *B23K 20/22* (2013.01); *B23K 37/0408* (2013.01); *B23K 37/0443* (2013.01); *B23K 37/0461* (2013.01); *B29C 65/20* (2013.01); *B29C 65/7841* (2013.01); *B29C 66/1142* (2013.01); *B29C 66/1162* (2013.01); *B29C 66/43* (2013.01); *B29C 66/4324* (2013.01); *B29C 66/43441* (2013.01); *B29C 66/5241* (2013.01); *B29C 66/52441* (2013.01); *B29C 66/8225* (2013.01); *B29C 66/855* (2013.01); *B29C 66/861* (2013.01); *F16G 3/10* (2013.01);
(Continued)

(58) Field of Classification Search
CPC ... B29C 66/4324; B29C 66/855; F16G 3/003; F16G 3/10; F16G 3/16
See application file for complete search history.

(56) References Cited

U.S. PATENT DOCUMENTS

| 4,867,835 A * | 9/1989 | Poole | B29C 65/20 |
| | | | 156/304.2 |
| 7,650,987 B2 * | 1/2010 | Taniguchi | B29C 65/02 |
| | | | 198/844.2 |
| 2014/0060730 A1 * | 3/2014 | Pan | B29C 65/5057 |
| | | | 156/250 |

FOREIGN PATENT DOCUMENTS

| CL | WO 2010012117 A1 * | 2/2010 | ............ B29C 65/18 |
| JP | 58000652 A * | 1/1983 | ............... F16G 3/10 |

* cited by examiner

*Primary Examiner* — Mark A Osele
(74) *Attorney, Agent, or Firm* — Dale J. Ream

(57) ABSTRACT

A mobile waterstop welding apparatus includes a first and second support member for supporting a first and second waterstop section, respectively. The second support member is movable between a loading configuration, a heating configuration, and a welding configuration. In the loading configuration, the first and second support members are spaced apart so that the first and second waterstop sections may be loaded onto the first and second support members. In the heating configuration, the first and second support members are spaced apart so that a heating iron may be placed in-between respective welding ends of the first and second waterstop sections. In the welding configuration, the first and second support members are moved towards each other so as to weld the first and second waterstop sections together at their respective welding ends. During the welding process, a spring assembly may urge the first and second support members towards each other.

19 Claims, 14 Drawing Sheets

(51) Int. Cl.
    *B29C 65/02*         (2006.01)
    *B29C 65/00*         (2006.01)
    *F16G 3/16*          (2006.01)
    *F16G 3/10*          (2006.01)
    *B23K 37/04*        (2006.01)
    *B29C 65/78*         (2006.01)
    *B23K 20/00*        (2006.01)
    *B23K 20/22*        (2006.01)
    *B29L 31/26*        (2006.01)

(52) U.S. Cl.
    CPC ............ *F16G 3/16* (2013.01); *B29L 2031/26* (2013.01); *E04B 1/6807* (2013.01)

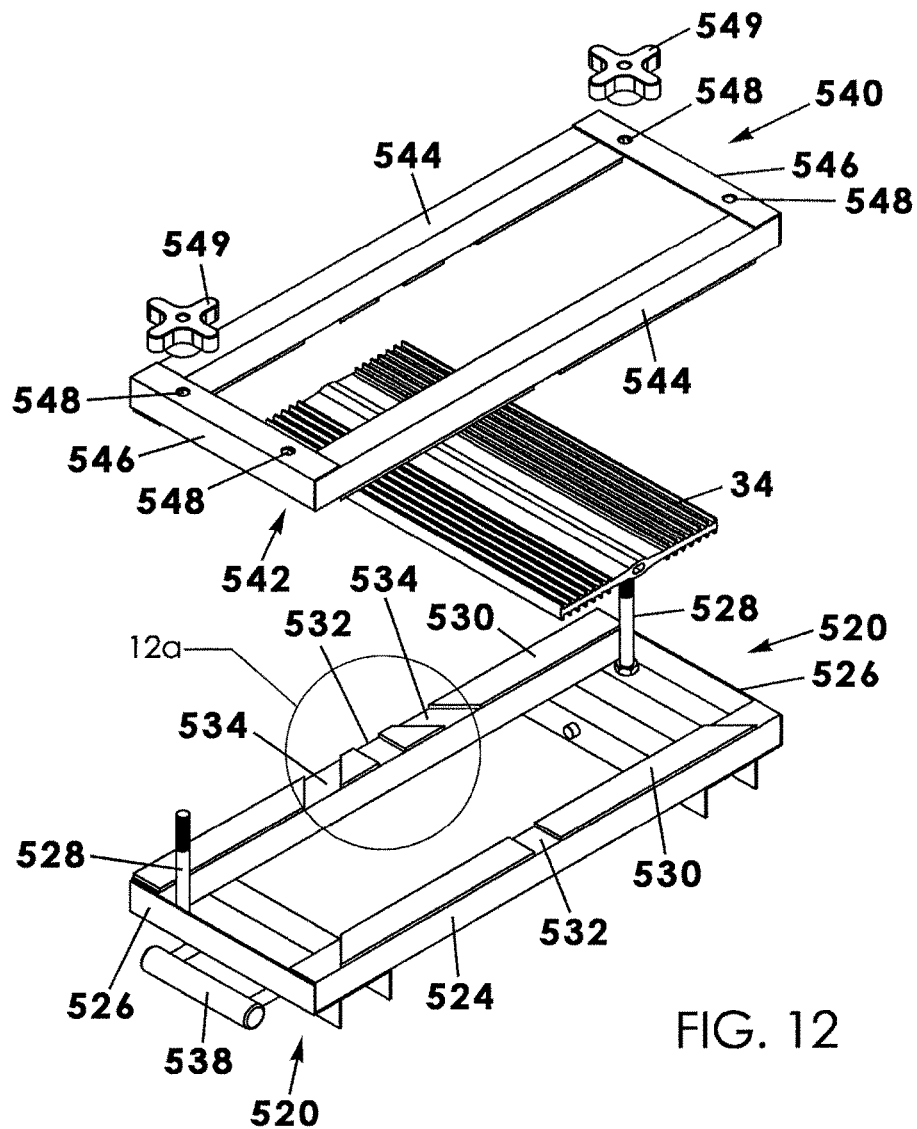
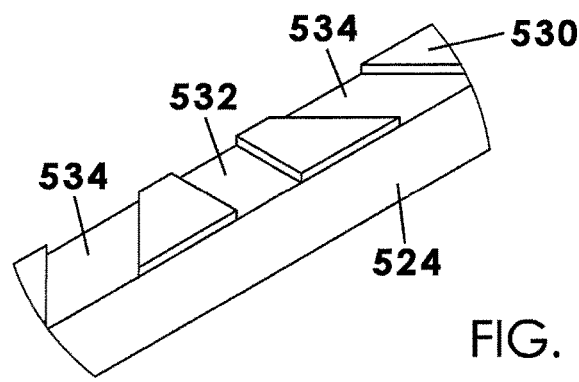
FIG. 12
FIG. 12a

MOBILE WATERSTOP WELDING APPARATUS

REFERENCE TO RELATED APPLICATION

This application is a continuation-in-part of and claims the benefit of non-provisional application Ser. No. 14/100,097 filed on Dec. 9, 2013, titled Mobile Waterstop Welding Apparatus.

BACKGROUND OF THE INVENTION

This invention relates generally to construction tools and, more particularly, to a mobile waterstop welding apparatus specifically configured to weld together two pieces of waterstop that are located at a construction site and positioned in-between or adjacent to rebar.

Waterstop may be used anywhere a fluid, such as water, may seep through a concrete joint. Concrete joints occur when concrete structures are poured in multiple stages. One such example is when a basement's concrete floor is poured and allowed to cure prior to pouring the basement's concrete walls. One or more pieces of waterstop may be embedded into the joint of the wall and the floor to prevent water from seeping into the basement at the wall-to-floor joint. Two pieces of waterstop may be welded together to prevent water from seeping therebetween.

A common practice of welding two pieces of waterstop together includes heating the ends of each piece of the waterstop until they are hot enough to be welded together. A special heating iron may be used in this heating process. Constant pressure may need to be exerted on each piece of waterstop to ensure that each end being heated maintains constant contact with the heating iron during the heating process. When the two ends are properly heated, they are removed from the heating iron and immediately butted together to begin a welding process. To ensure an effective weld, constant pressure may need to be applied to the two pieces as they are welded together.

Care must be taken to ensure that alignment of the two pieces of waterstop is maintained throughout the entire welding process. Maintaining alignment of the two pieces of waterstop can be difficult, especially when the waterstop is located at a construction site and positioned in-between or adjacent to rebar.

Various waterstop welding apparatuses have been proposed in the prior art. Although assumably effective for their intended purposes, the current devices are not capable of being used for two pieces of waterstop that are positioned in-between or adjacent to rebar and/or they do not effectively maintain alignment of the two pieces of waterstop during the welding process. Existing devices are either too large or cannot be configured into small spaces between rebar in order to quickly and efficiently weld waterstop sections at precisely the location where they are needed.

Therefore, it would be desirable to have a welding apparatus that maintains alignment of two pieces of waterstop during the welding process and is capable of being used for two pieces of waterstop that are positioned in-between or adjacent to rebar. Further, it would be desirable to have a welding apparatus capable of applying constant pressure to both pieces of waterstop during the heating process and the welding process.

SUMMARY OF THE INVENTION

A mobile waterstop welding apparatus according to the present invention includes a first support member for supporting a first waterstop section and a second support member for supporting a second waterstop section. The second support member is operatively coupled to the first support member and is movable between a closed configuration and a variety of open configurations. The open configurations may include a loading configuration, a heating configuration, and a welding configuration. The first support member may also be movable between a closed configuration, a loading configuration, a heating configuration, and a welding configuration.

The mobile waterstop welding apparatus may also include a linkage assembly, a track assembly, and/or a spring assembly. The linkage assembly may move the first and/or second support members; the track assembly may guide the movement of the first and/or second support members; and the spring assembly may urge the first and second support members towards each other.

The mobile waterstop welding apparatus may also include a back plate and a plurality of hanging members. The plurality of hanging members may be used to selectively hang the mobile waterstop welding apparatus from rebar. The back plate may be used to prevent the rebar from interfering with the movement of the first and/or second support members.

In an embodiment, the mobile waterstop welding apparatus may also include a pair of die assemblies for selectively coupling respective first and second waterstop sections to the first and second support members, each die assembly having an upper portion removably coupled to a lower portion and configured to sandwich a respective waterstop section therebetween. The die assemblies are configured to enable the waterstop sections to be positioned at strategic angles so as to form angled butt joints if desired.

Therefore, a general object of this invention is to provide a mobile waterstop welding apparatus that is capable of being used to weld together two waterstop sections that are located at a construction site and positioned in-between or adjacent to rebar.

Another object of this invention is to provide a mobile waterstop welding apparatus, as aforesaid, that maintains alignment of two waterstop sections during a welding process.

Still another object of this invention is to provide a mobile waterstop welding apparatus, as aforesaid, that applies constant pressure to two pieces of waterstop during the heating process and the welding process.

Yet another object of this invention is to provide a mobile waterstop welding apparatus, as aforesaid, that is easy to use and inexpensive to manufacture.

Other objects and advantages of the present invention will become apparent from the following description taken in connection with the accompanying drawings, wherein is set forth by way of illustration and example, embodiments of this invention.

BRIEF DESCRIPTION OF THE DRAWINGS

FIG. 12 is an exploded view of a die assembly removed from the apparatus as in FIG. 10;

FIG. 12a is an isolated view on an enlarged scale taken from FIG. 12;

DESCRIPTION OF THE PREFERRED EMBODIMENT

Figure 1:
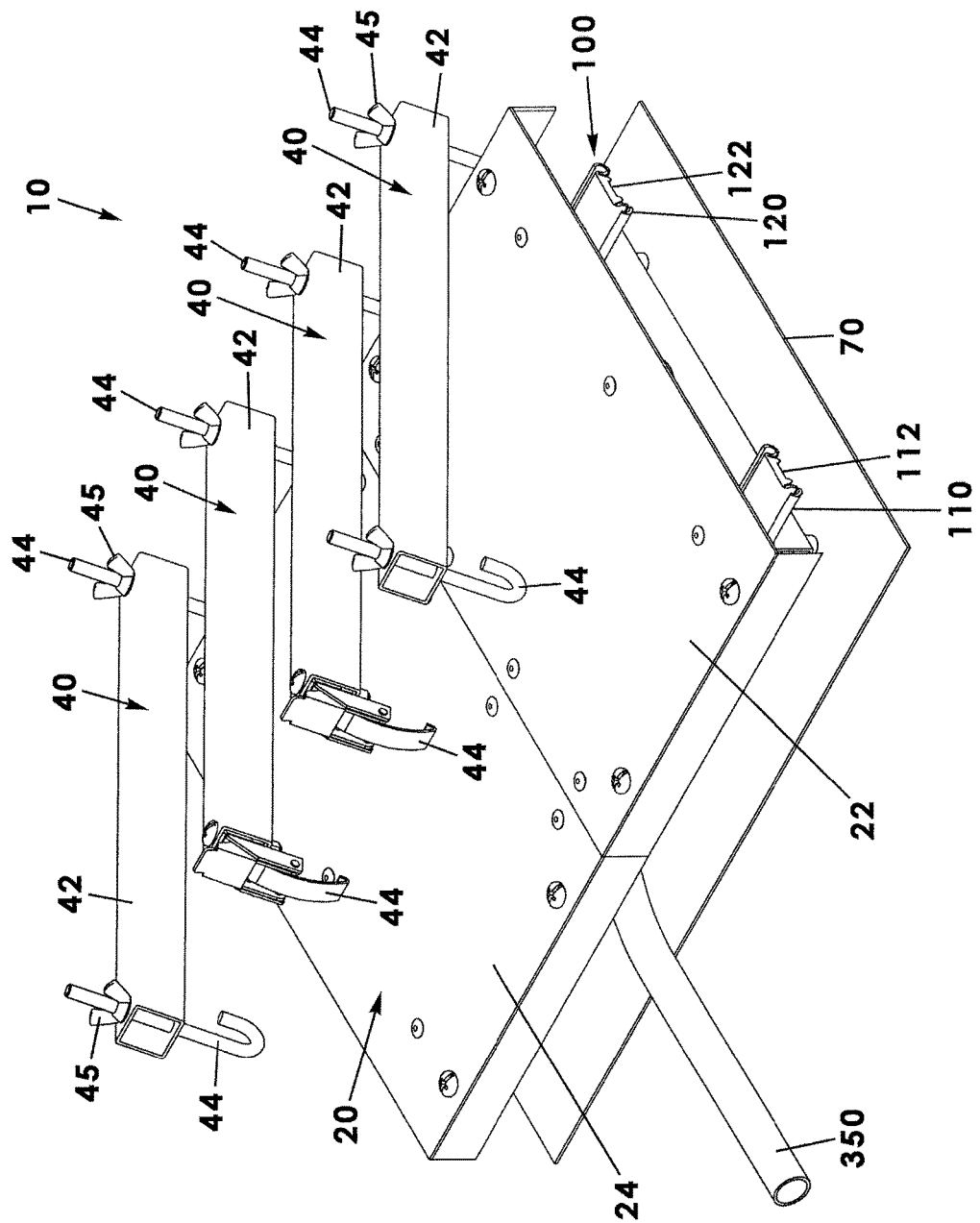
FIG. 1 is a perspective view of a mobile waterstop welding apparatus, according to a preferred embodiment of the present invention, illustrating a first and second support member in a closed configuration and a plurality of clamping members partially coupled to the first and second support members.
Figure 2:
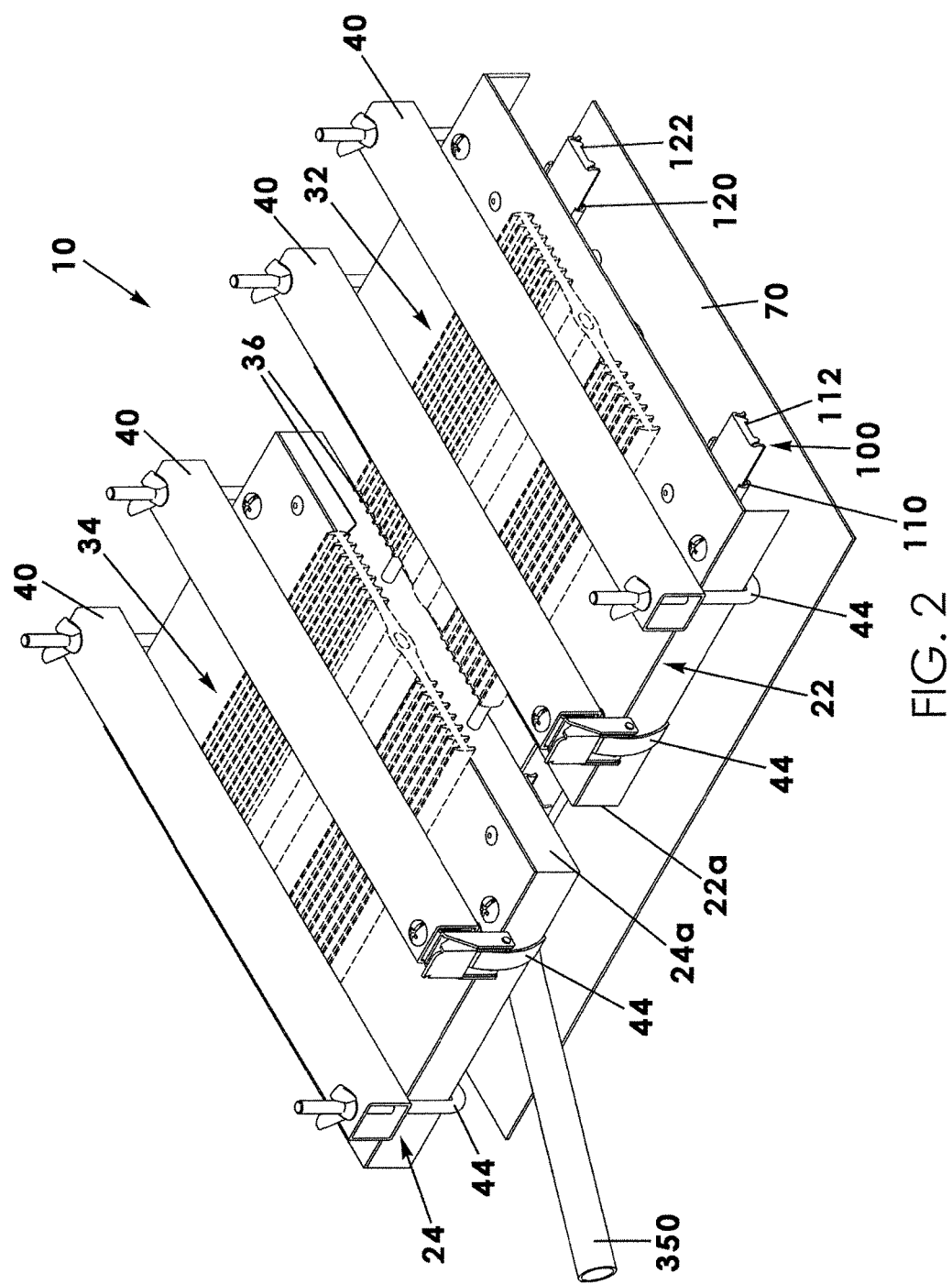
FIG. 2 is a perspective view of the mobile waterstop welding apparatus, as in FIG. 1, illustrating the first and second support members in a loading configuration with a first and second waterstop section secured to respective first and second support members with a plurality of clamping members.

A mobile waterstop welding apparatus according to a preferred embodiment of the present invention will now be described with reference to FIGS. 1 to 15 of the accompanying drawings. The mobile waterstop welding apparatus 10 includes a support assembly 20 configured to support respective welding ends 36 of first 32 and second 34 waterstop sections. The first waterstop section 32 and/or the second waterstop section 34 may be located at a construction site and positioned in-between rebar.

The mobile waterstop welding apparatus 10 includes first 22 and second 24 support members. The second support member 24 is operatively coupled to the first support member 22 and movable between a closed configuration (FIG. 1) and a variety of open configurations, including a loading configuration, a heating configuration, and a welding configuration. The first support member 22 may also be moveable between a closed configuration, a loading configuration, a heating configuration, and/or a welding configuration. In the closed configuration, an inner edge 22a of the first support member 22 may touch an inner edge 24a of the second support member 24. The distance between respective inner edges 22a, 24a of the first 22 and second 24 support members is measurably greater when the first 22 and second 24 support members are in an open configuration (FIG. 2) than when the first 22 and second 24 support members are in the closed configuration (FIG. 1).

Figure 8:
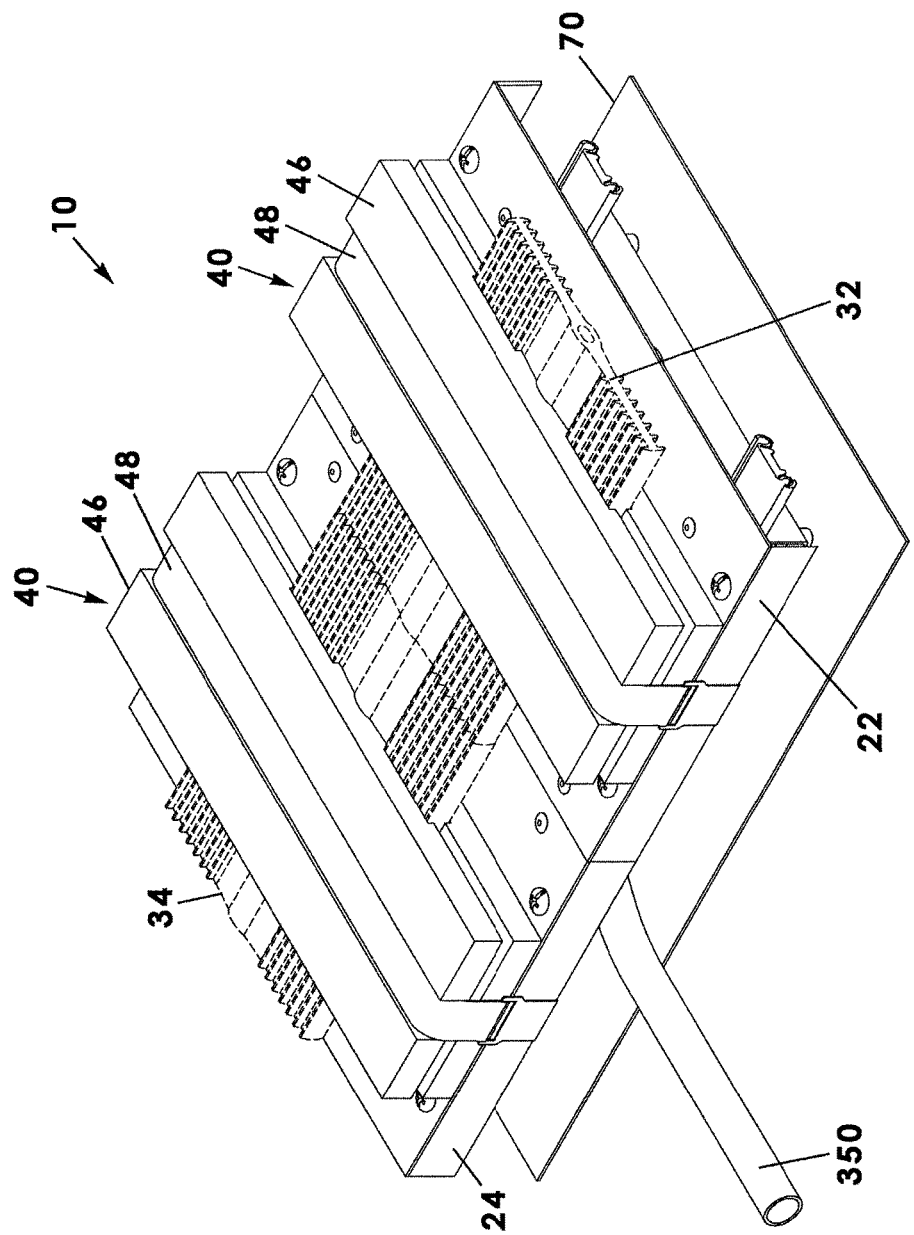
FIG. 8 is a perspective view of the mobile waterstop welding apparatus, as in FIG. 2, illustrating a pair of clamping straps and a pair of clamping blocks securing the first and second waterstop sections to respective first and second support members.

In the loading configuration, the first 22 and second 24 support members are spaced apart so as to allow respective welding ends 36 of the first 32 and second 34 waterstop sections to hang over respective inner edges 22a, 24a of respective first 22 and second 24 support members. Clamping members 40 may be selectively coupled to the first 22 and second 24 support members to secure the first 32 and second 34 waterstop sections to the first 22 and second 24 support members, respectively. In one embodiment, a clamping member 40 includes a clamping bar 42 and at least one clamping connector 44 coupled to the clamping bar 42 and selectively and releasably coupled to the first 22 or second 24 support member. The clamping connector 44 may be tightened or loosened with a fastener 45 such as a wing nut or the like. It is understood that the clamping connects may include clamps, latches, hooks, or other suitable fasteners. In another embodiment, a clamping member 40 includes a clamping block 46 and a clamping strap 48 coupled to the clamping block and the first 22 or second 24 support members (FIG. 8).

Figure 3:
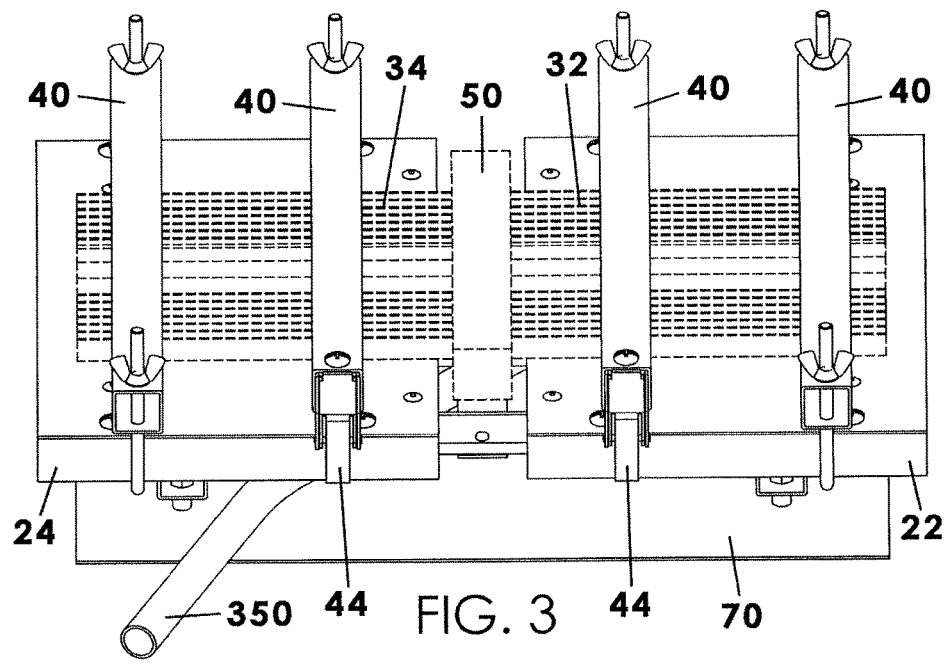
FIG. 3 is a perspective view of the mobile waterstop welding apparatus, taken from a different angle as FIG. 2, illustrating the first and second support members in a heating configuration and a heating iron positioned between the first and second waterstop sections.

In the heating configuration, the first 32 and second 34 waterstop sections are spaced apart so that their respective welding ends 36 may be contacted together by the heating iron 50 (FIG. 3). While in this configuration, the heating iron 50 heats respective welding ends 36 of the first 32 and second 34 waterstop sections. To ensure constant contact of the welding ends 36 of the first 32 and second 34 waterstop sections with the heating iron 50, the second support member 24 may be urged towards the first support member 22, either manually or automatically.

Figure 4:
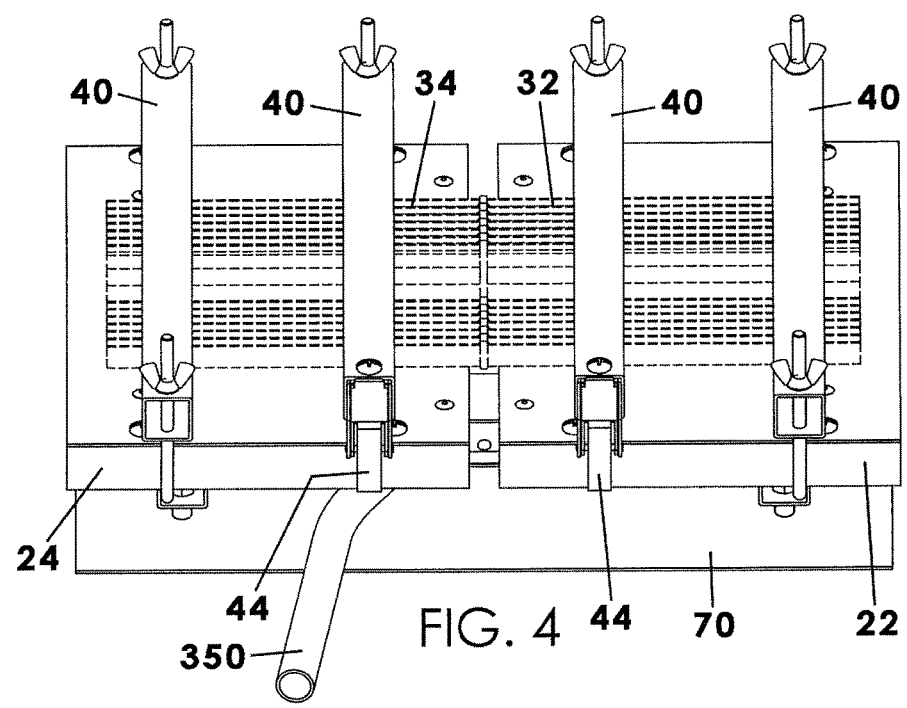
FIG. 4 is a perspective view of the mobile waterstop welding apparatus, as in FIG. 3, showing the first and second support members in a welding configuration.
Figure 5:
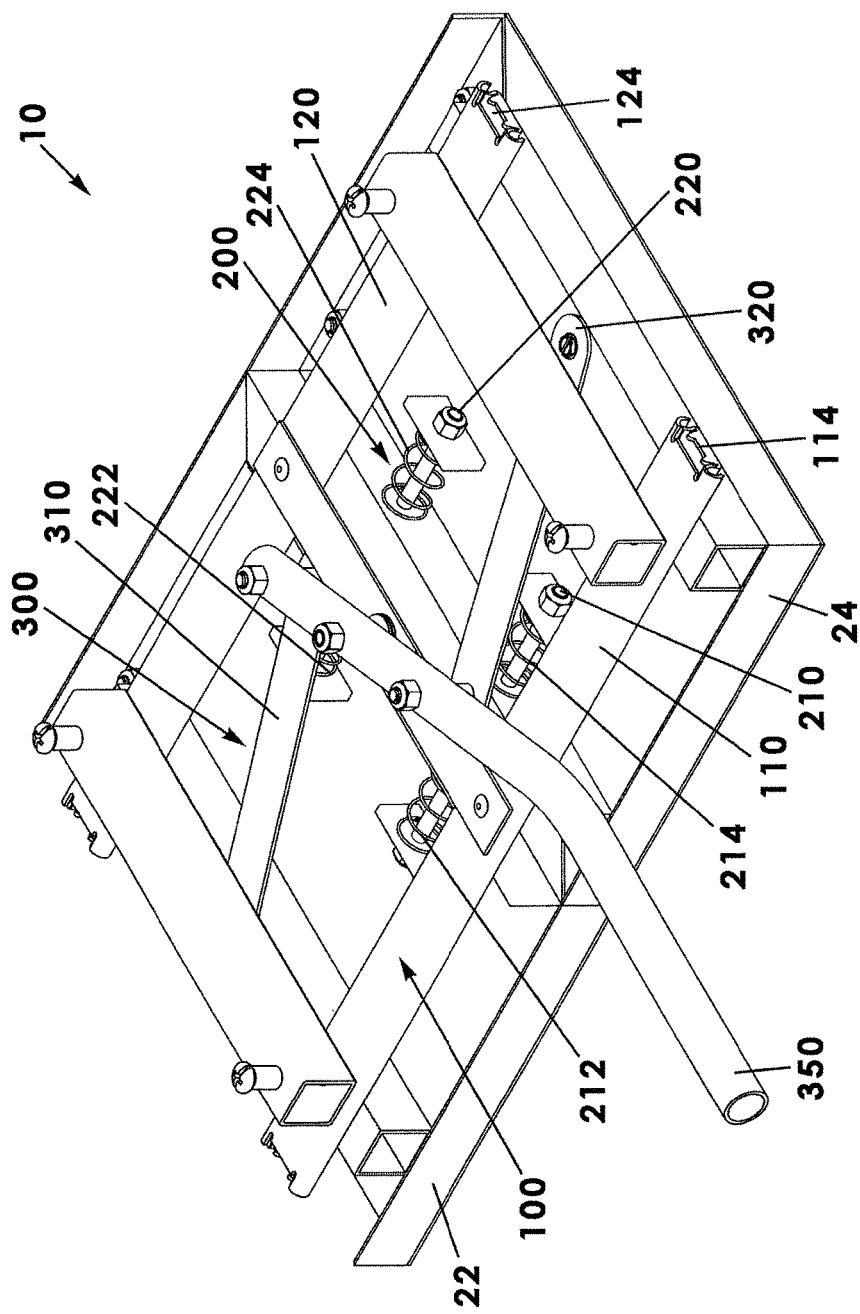
FIG. 5 is a perspective view of the mobile waterstop welding apparatus, taken from a different angle as FIG. 1, showing the first and second support members in a closed configuration.
Figure 6:
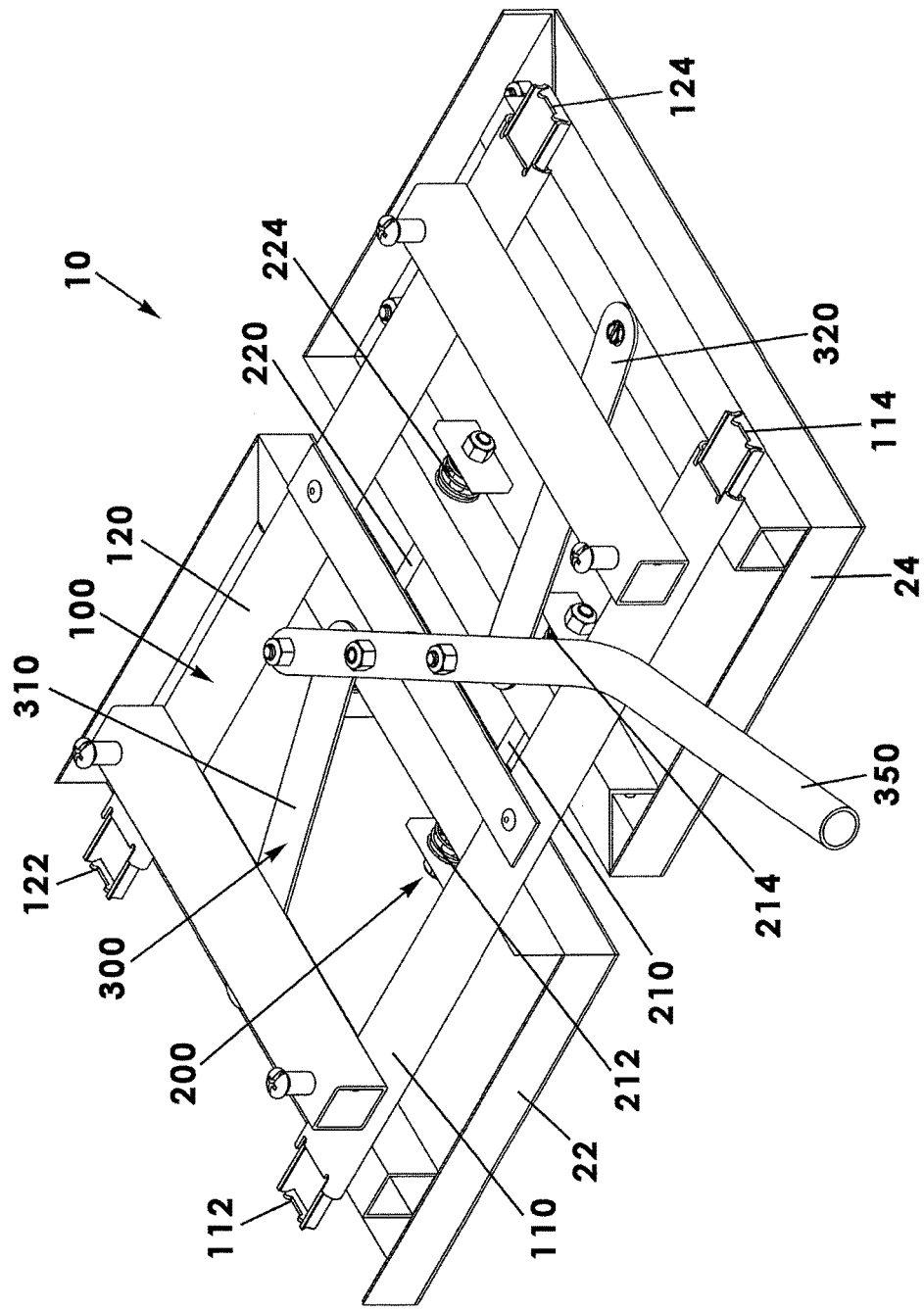
FIG. 6 is a perspective view of the mobile waterstop welding apparatus, as in FIG. 5, showing the first and second support members in an open configuration.
Figure 7:
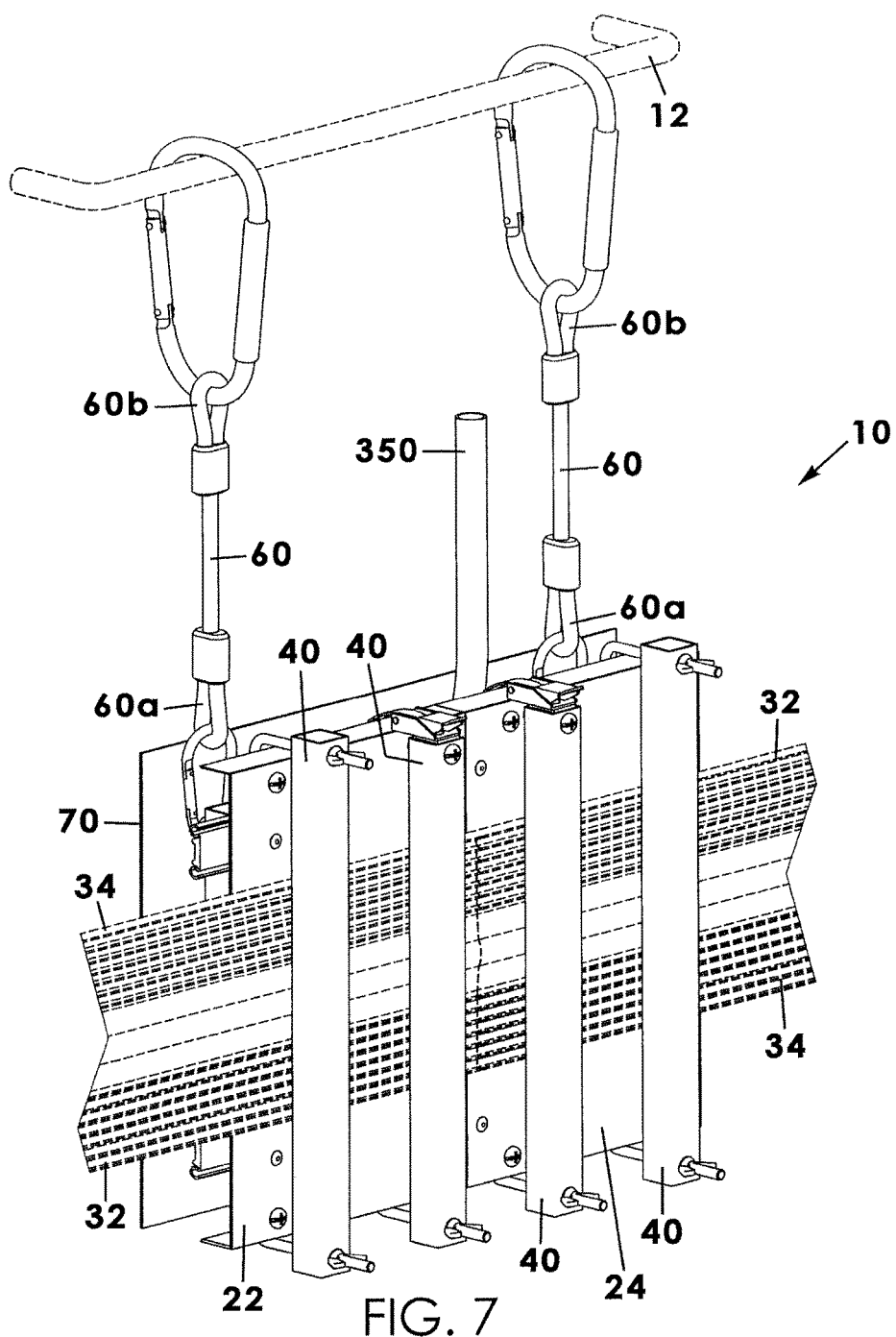
FIG. 7 is a perspective view of the mobile waterstop welding apparatus, taken from a different angle as FIG. 1, illustrating a pair of hanging members coupled to a pair of hanging elements and hanging from rebar.

In the welding configuration, respective welding ends 36 of the first 32 and second 34 waterstop sections contact each other (FIG. 4). If the waterstop sections are hot enough, they will be welded together. As the first 32 and second 34 waterstop sections are welded together, the second support member 24 may be urged towards the first support member 22, either manually or automatically, so as to create a more effective weld.

A track assembly 100, a spring assembly 200, and/or a linkage assembly 300 may be operatively coupled to the first 22 and second 24 support members. As will be explained below in more detail, the linkage assembly 300 may move the first 22 and second 24 support members between the loading configuration, the heating configuration, and/or the welding configuration; the spring assembly 200 may urge the first 22 and second 24 support members towards the closed configuration; and the track assembly 100 may guide the first 22 and second 24 support members as they are moved between the loading configuration, the heating configuration, and/or the welding configuration.

The track assembly 100 may include a first 110 and second 120 track members operatively coupled to the first 22 and second 24 support members. The first track member 110 may be displaced from and parallel to the second track member 120. The track assembly may also include a first 112 and third 122 slide member coupled to the first support member 22 and a second 114 and fourth 124 slide member coupled to the second support member 24. The first 112 and second 114 slide members may be in communication with the first track member 110. The third 122 and fourth 124 slide members may be in communication with the second track member 120. The slide members enable the first 22 and second 24 support members to be moved selectively between open and closed configurations.

The spring assembly 200 may include first 212 and third 222 springs operatively coupled to the first support member 22 and configured so as to urge the first 22 and second 24 support members towards the closed configuration. The spring assembly may also include second 214 and fourth 224 springs operatively coupled to the second support member 24. A first 210 and second 220 plunger may be operatively coupled to the first 22 and second 24 support members. The first plunger 210 may be in communication with the first 212 and second 214 springs. The second plunger 220 may be in communication with the third 222 and fourth 224 springs.

Figure 9:
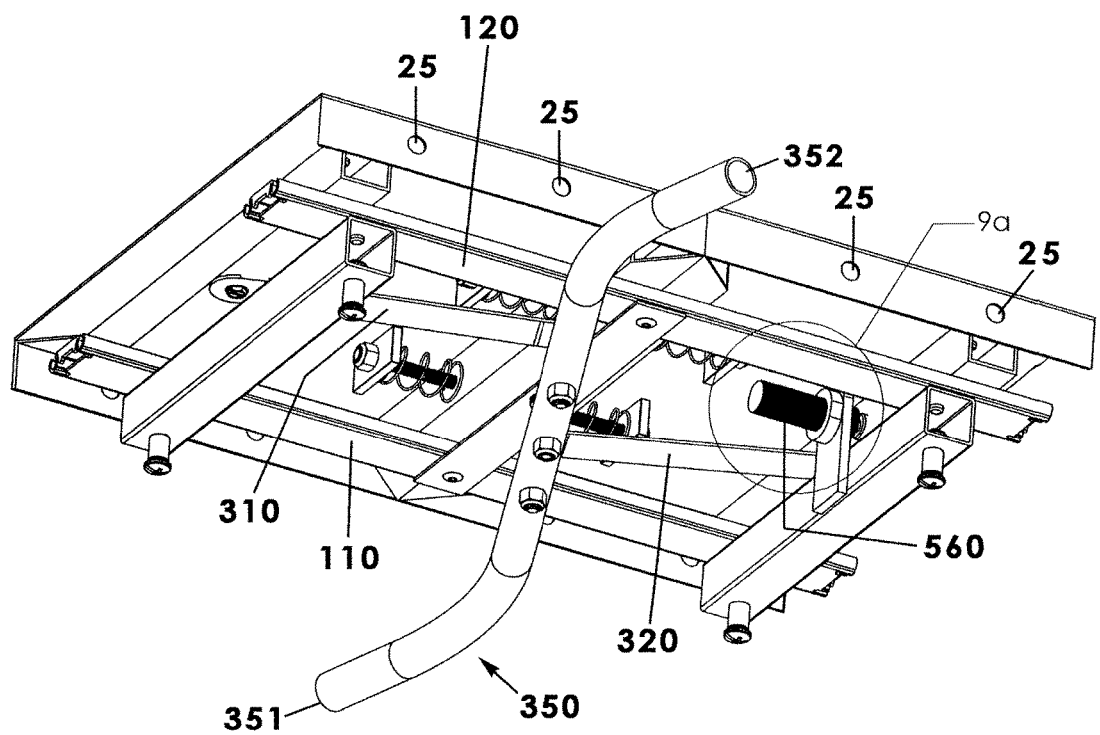
FIG. 9 is a perspective view from a lower angle of a mobile waterstop welding apparatus, according to a another embodiment of the present invention.
Figure 9A:
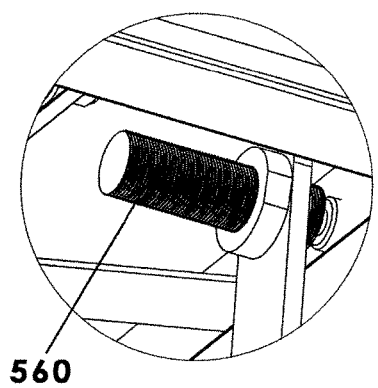
FIG. 9a is an isolated view on an enlarged scale taken from FIG. 9.
Figure 10:
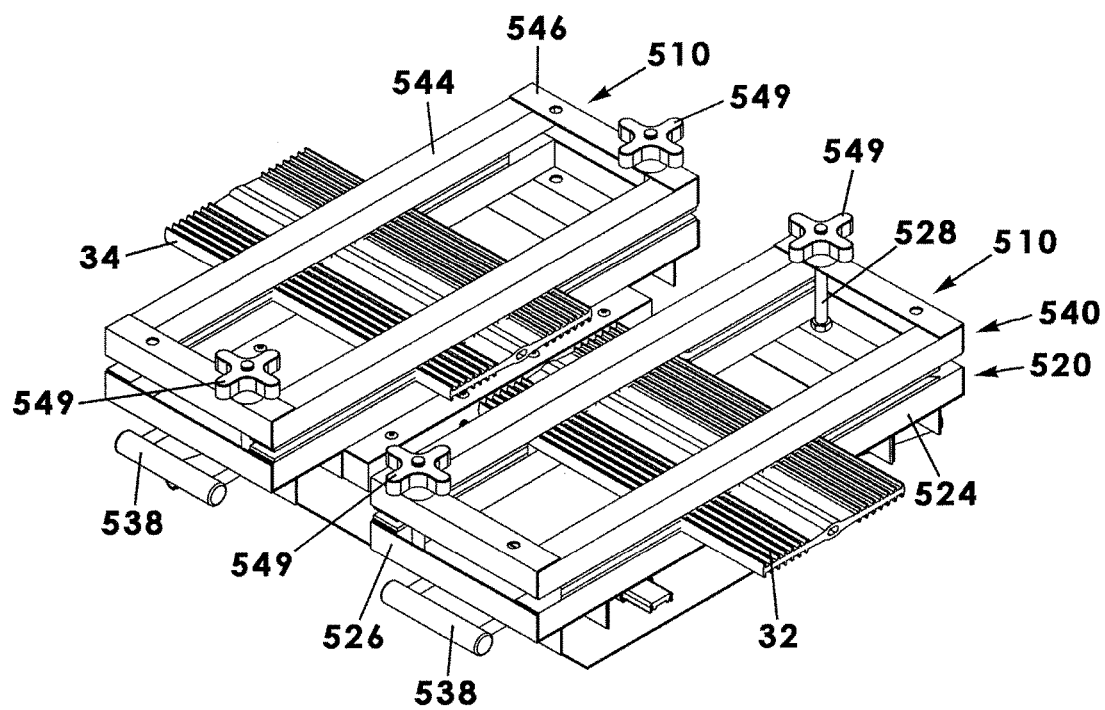
FIG. 10 is a perspective view of the apparatus as in FIG. 9 from an upper angle illustrating the first and second support members in a loading configuration.
Figure 11:
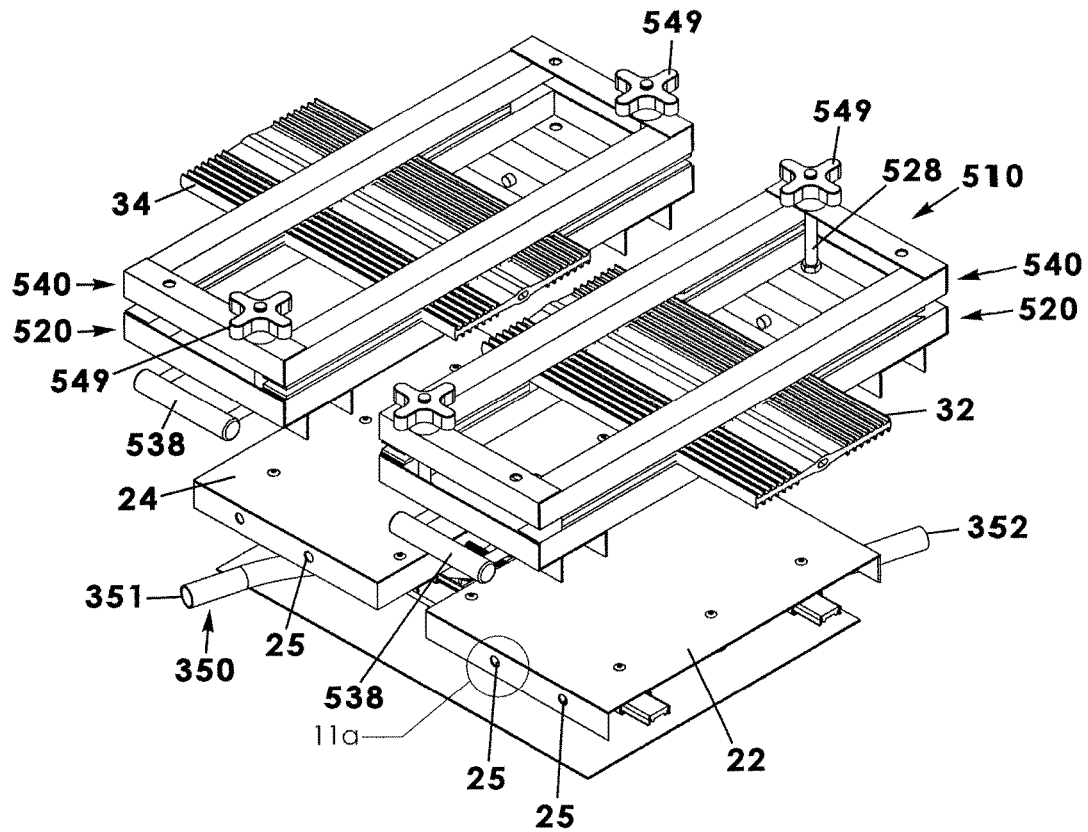
FIG. 11 is an exploded view of the apparatus as in FIG. 10.
Figure 11A:
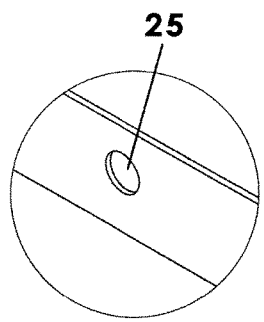
FIG. 11a is an isolated view on an enlarged scale taken from FIG. 11.

The linkage assembly 300 may include first 310 and second 320 linkage members coupled to the first 22 and second 24 support members, respectively, such that movement of the first 310 and second 320 linkage members causes the first 22 and second 24 support members to move along corresponding elements of the track assembly 100. A handle 350 may be operatively coupled to the first 310 and second 320 linkage members so as to provide a mechanical advantage for moving the first 22 and second 24 support members between the closed configuration, the loading configuration, the heating configuration, and/or the welding configuration as described previously. The handle 350 may have a first end 351 (FIGS. 1, 5, and 6) and may have an opposed second end 352 so as to be accessed by a user from either side of the apparatus 10 (FIG. 9). More particularly, a user may utilize the handle 350 to easily move the support members 22, 24 between the configurations described above.

A plurality of hanging members 60 may be selectively coupled to the first 22 and second 24 support members such that the mobile waterstop welding apparatus 10 may be selectively hung from a support structure 12 such as rebar. In one embodiment (shown in FIG. 7), a single hanging member 60 may be coupled to each support member 22, 24, respectively and extend away therefrom and configured for selective attachment to the support structure 12. A back plate 70 may be coupled to the first 22 and second 24 support members so as to prevent the support structure 12 from interfering with the movement of the first 22 and second 24 support members. More particularly, each hanging member 60 may include a first end 60a coupled to the back plate 70, a respective support member, or other suitable structure, and a second end 60b having a fastener, such as a latch, carabineer, or the like configured to be releasably coupled to rebar.

In use, a person utilizes the handle 350 to cause the linkage assembly 300 to move the first 22 and second 24 support members to the loading configuration (at which ends 22a and 24a of respective support members 22, 24 are spaced apart). A spacing member (not shown) may be positioned between respective first 22 and second 24 support members to maintain their respective positions. After the first 32 and second 34 waterstop sections are loaded onto respective first 22 and second 24 support members and secured with clamping members 40, the handle 350 may be used to move the first 22 and second 24 support members out of the loading configuration so that the spacing member (not shown) may be removed.

While using the handle 350 to hold the first 22 and second 24 support members in the open configuration, a heating iron 50 may be placed between respective welding ends 36 of the first 32 and second 34 waterstop sections (FIG. 3). The handle 350 may then be used to move the first 22 and second 24 support members to the heating configuration. Upon releasing the handle 350, the spring assembly 200 may urge the first 22 and second 24 support members towards the closed configuration such that respective welding ends 36 of the first 32 and second 34 waterstop sections maintain constant contact with the heating iron 50.

Upon heating respective welding ends 36 of the first 32 and second 34 waterstop sections, the handle 350 may be used to move the first 22 and second 24 support members to the open configuration so that the heating iron 50 may be removed. The handle 350 may then be used to move the first 22 and second 24 support members to the welding configuration (FIG. 4). Upon releasing the handle 350, the spring assembly 200 may urge the first 22 and second 24 support members towards the closed configuration so as to create a more effective weld. In addition, the entire apparatus may be hung from rebar or another support structure 12 at the worksite where a waterstop weld is desired, as described above and shown in FIG. 7.

Another embodiment of the a mobile waterstop welding apparatus 500 is shown in detail in FIGS. 9 to 15a and is substantially similar to the embodiment first described above and shown in FIGS. 1 to 8 except as specifically noted below. Specifically, the clamping members 40 are replaced with a pair of die assemblies 510 for holding and properly positioning the waterstop sections 32, 34 in position for welding. Each die assembly 510 includes a lower portion 520 and an upper portion 540 removably coupled to the upper portion 540. Each die assembly 510 is configured to be removably coupled to respective first and second support members 22, 24 as will be described below.

Each lower portion 520 of a die assembly 510 includes a lower framework 522 having a lower framework side member 524 having an elongate configuration extending longitudinally between opposed lower framework end members 526. At least a first fastener 528 extends upwardly from the lower framework 522, the first fastener 528 preferably being a bolt, rod, or other type of linear shaft and may define a threaded terminal end.

Similarly, each upper portion 540 of a respective die assembly 510 may include an upper framework 542 having an upper framework side member 544 having an elongate configuration extending longitudinally between opposed upper framework end members 546. The upper framework 542 defines at least one vertical bore 548 or aperture configured to receive a respective first fastener 528 therein. When a first fastener 528 is inserted into and received by a bore 548, the lower portion 520 and upper portion 540 are coupled together. Further, each upper portion 540 may include a second fastener 549 configured to be removably coupled to the terminal end of the first fastener, such as by being threadably coupled in the manner of a bolt and nut combination.

An upper surface 530 of the lower framework 522 of a respective die assembly 510 defines at least one alignment groove having a shape configuration that is complementary to an alignment flange or shape feature of a respective waterstop section. More particularly, the upper surface 530 of the lower framework side member 524 defines a first alignment groove 532 that is perpendicular to the longitudinal extent of the lower framework side member 524 and that is configured to receive an alignment flange of a respective waterstop section. Preferably, the first alignment groove 532 is situated about midway between opposed lower framework end members 526.

Further, the upper surface 530 of the lower framework side member 524 defines a second alignment groove 534 that is angled relative to the longitudinal extent of the lower framework side member 524 and that is configured to receive an alignment flange of a respective waterstop section. Similarly, the upper surface 530 of the lower framework side member 524 defines a third alignment groove 536 that is angled relative to the longitudinal extent of the lower framework side member 524 and that is configured to receive an alignment flange of a respective waterstop section. Even more specifically, the second 534 and third 536 alignment grooves are positioned on opposite sides of the first alignment groove 532, i.e. one on each side of the first alignment groove 532 along the lower framework side member 524. Each of the second 534 and third 536 alignment grooves are angled away from the first alignment groove 532, e.g. angled toward opposed ends of the lower framework 522 and, preferably, angled at about a 45 degree angle.

In addition, a lower surface 550 of the upper framework 542 of a respective die assembly 510 defines at least one alignment groove having a shape configuration that is complementary to an alignment flange or shape feature of a respective waterstop section. More particularly, the lower surface 550 of the upper framework side member 544 defines a first alignment groove 552 that is perpendicular to the longitudinal extent of the upper framework side member 544 and that is configured to receive an alignment flange of a respective waterstop section. Preferably, the first alignment groove 552 is situated about midway between opposed upper framework end members 546.

Further, the lower surface 550 of the upper framework side member 544 defines a second alignment groove 554 that is angled relative to the longitudinal extent of the upper framework side member 544 and that is configured to receive an alignment flange of a respective waterstop section. Similarly, the lower surface 550 of the upper framework side member 544 defines a third alignment groove 556 that is angled relative to the longitudinal extent of the upper framework side member 544 and that is configured to receive an alignment flange of a respective waterstop section. Even more specifically, the second 554 and third 556 alignment grooves of the upper framework 542 are positioned on opposite sides of the first alignment groove 552, i.e. one on each side of the first alignment groove 552 along the upper framework side member 544. Each of the second 554 and third 554 alignment grooves are angled away from the first alignment groove 552, e.g. angled toward opposed ends of the upper framework 542 and, preferably, angled at about a 45 degree angle.

A respective die assembly 510 may be releasably coupled to a first 22 or second 24 support member. More particularly, a lower framework 522 of a respective lower portion 520 of a respective die assembly 510 includes a first retention handle 538 operatively coupled to one end of the lower framework 522. A first retention pin 539 extends inwardly from the first retention handle 538 and has a terminal end configured to selectively engage one of the first and second support members 22, 24. It is understood that the first 22 and second 24 support members may include complementary structures, e.g. recesses or apertures, to selectively receive the terminal end of the first retention pin 539 so that the lower framework 522 is removably coupled to the support member. Further, the first retention pin 539 may include a spring loaded structure (first spring 539a) so that the first retention handle 538 may be pulled outwardly to pull the first retention pin 539 away from the respective support member—thus, enabling the die assembly 510 to be selectively removed.

Similarly, the lower framework 522 of a respective lower portion 520 of a respective die assembly 510 may include a second retention handle 558 operatively coupled to one end of the lower framework 522. A second retention pin 559 extends inwardly from the second retention handle 558 and has a terminal end configured to selectively engage one of the first and second support members 22, 24. It is understood that the first 22 and second 24 support members may include complementary structures, e.g. recesses or apertures, to selectively receive the terminal end of the second retention pin 559 so that the lower framework 522 is removably coupled to the support member. Further, the second retention pin 559 may include a spring loaded structure (second spring 559a) so that the second retention handle 558 may be pulled outwardly to pull the second retention pin 559 away from the respective support member—thus, enabling the die assembly 510 to be selectively removed.

In another aspect, a damper assembly 560 is attached to one of the first 22 and 24 support members as well as to the track assembly 100. Thus, the damper assembly 560 operatively couples one of said first and second support members to said track assembly, said damper assembly 560 being configured to slow a speed at which said spring assembly 200 normally urges said first and second support members towards the closed configuration.

Figure 13:
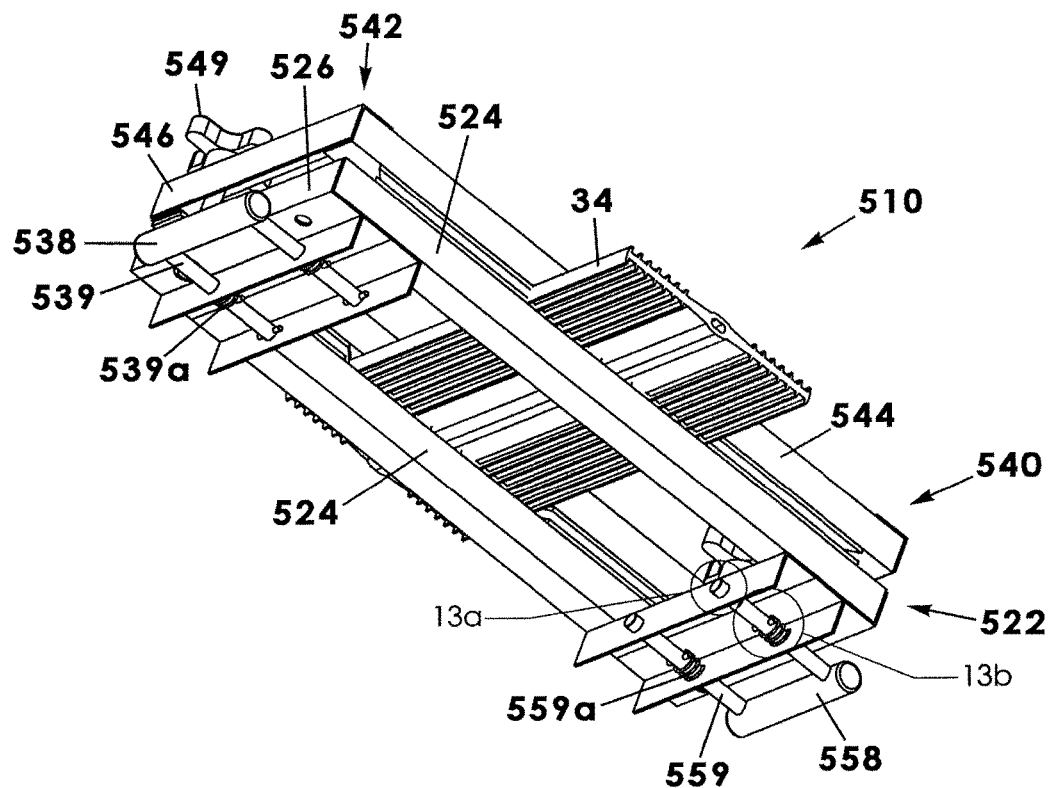
FIG. 13 is a perspective view from a lower angle of the die assembly as in FIG. 12.
Figure 13A:
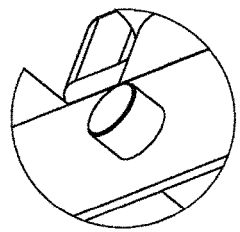
FIG. 13a is an isolated view on an enlarged scale taken from FIG. 13.
Figure 13B:
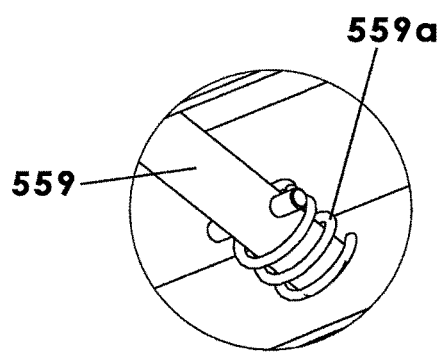
FIG. 13b is an isolated view on an enlarged scale taken from FIG. 13.
Figure 14A:
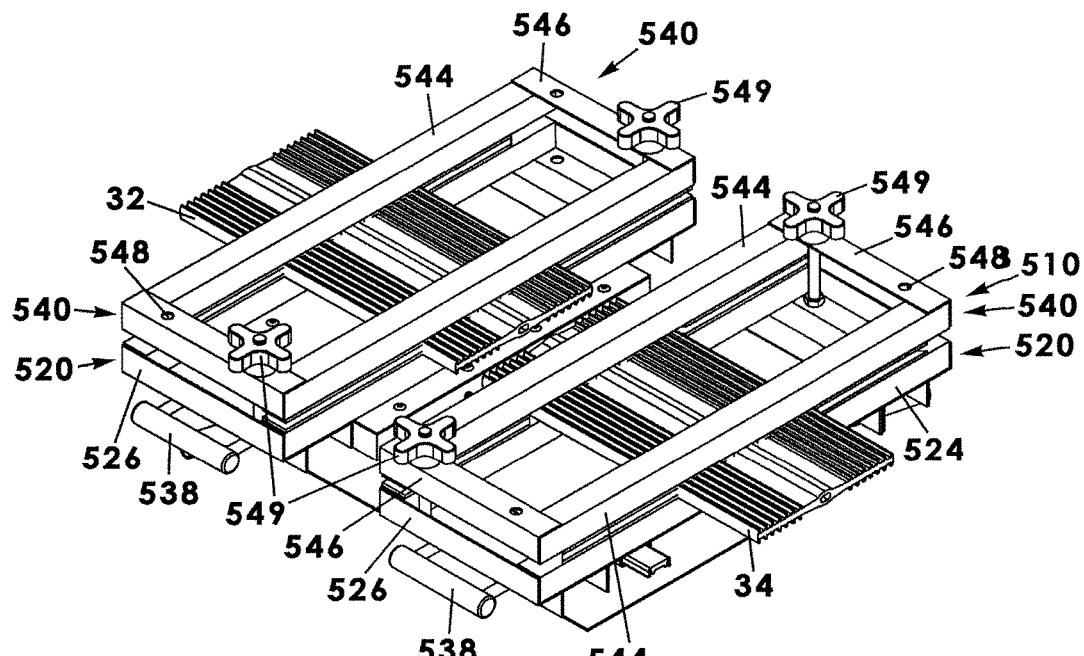
FIG. 14a is a perspective view of the apparatus as in FIG. 10 illustrating the first and second support members in a loading configuration for welding a straight joint.
Figure 14B:
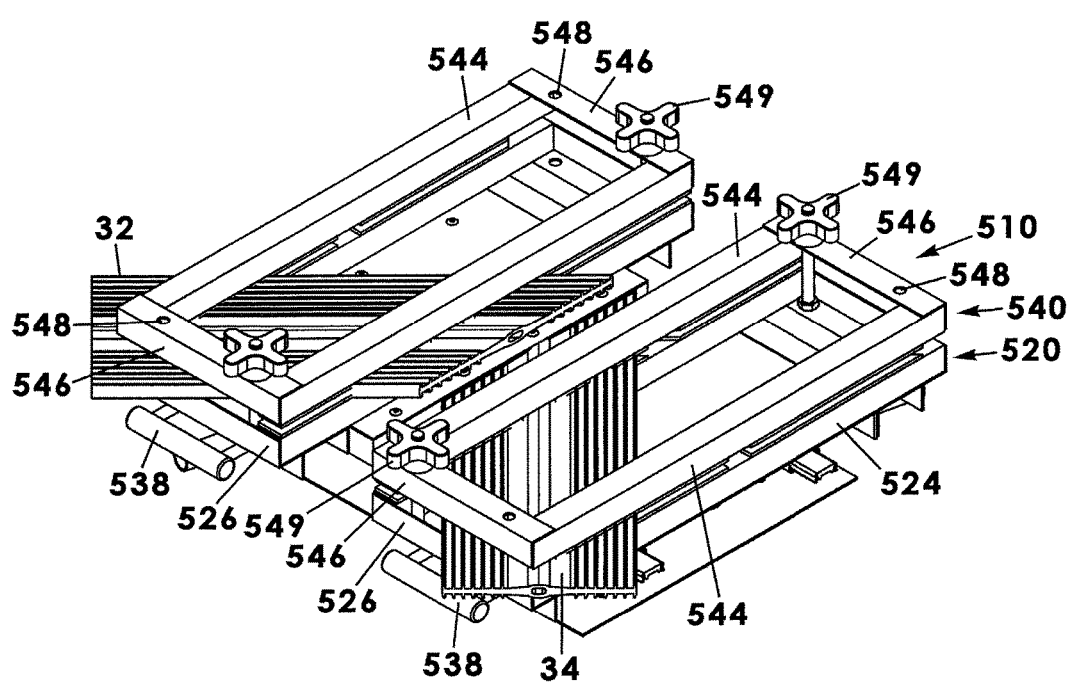
FIG. 14b is a perspective view of the apparatus as in FIG. 10 illustrating the first and second support members in a loading configuration for welding a 90 degree joint.

In use, the pair of die assemblies 510 are utilized to properly position respective waterstop sections 32, 34 to be welded. First, a respective upper portion 540 and lower portion 520 of a respective die assembly 510 is separated as described above and as shown in FIG. 12. Then, a section 34 of waterstop material is situated atop the upper surface 530 of a lower framework 522. Specifically, the waterstop section 34 may be positioned straight across the lower framework 522 with its alignment flange nested in the first alignment groove 532 as shown in FIG. 13, or positioned at an angle within its alignment flange nested in either the second alignment groove 534 or third alignment groove 536 as shown in FIG. 14b. Then, the upper portion 540 may be coupled to the lower portion 520 as described above so that the respective waterstop section is sandwiched tightly therebetween.

Figure 15:
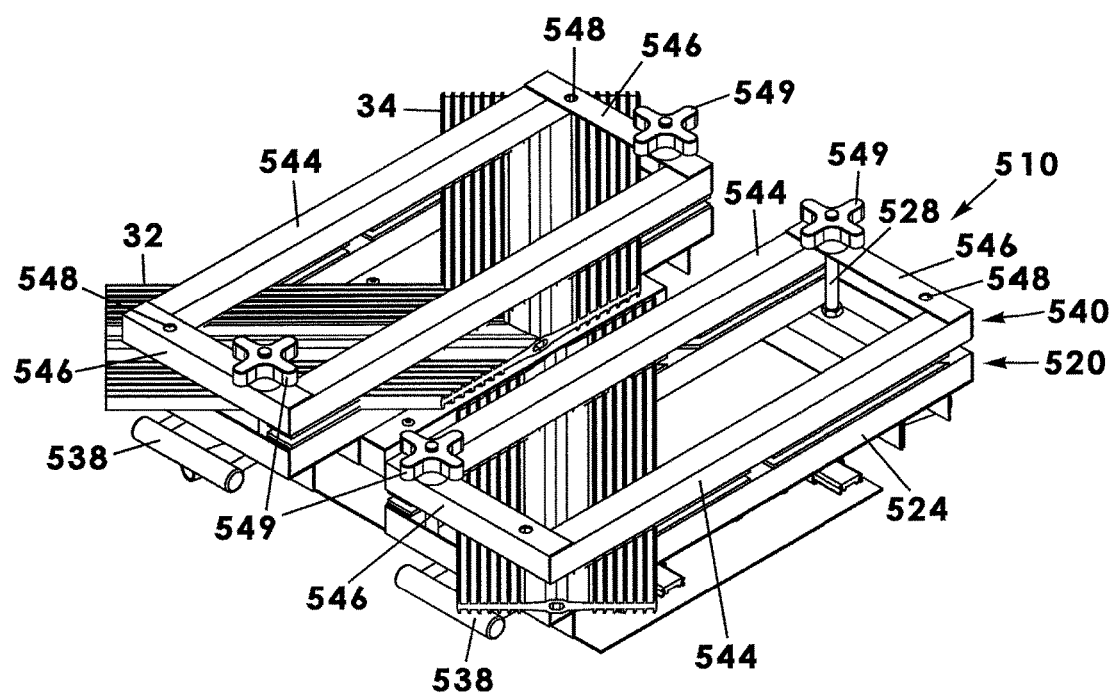
FIG. 15 is a perspective view of the apparatus as in FIG. 10 illustrating the first and second support members in a loading configuration for welding a T-joint.

Another waterstop section 32 may be positioned on another respective die assembly 510 in the same manner. Then, the loaded and secured pair of die assemblies may be mounted to the first support member 22 and second support member 24. Specifically, the retention handles may be operated as described above so as to clamp each die assembly to respective support members. The configuration of FIG. 14b demonstrates that the present invention is particularly useful for welding 90 degree angled butt joints. The apparatus may also be used to weld T-shaped joints as well (FIG. 15).

The actual welding process of the two sections 32, 34 of waterstop material may be accomplished by operation of the handle 350 and linkage 300 in the same manner of the embodiment first described above It is understood that while certain forms of this invention have been illustrated and described, it is not limited thereto except insofar as such limitations are included in the following claims and allowable functional equivalents thereof.

The invention claimed is:

1. A mobile waterstop welding apparatus for use in welding together a first waterstop section to a second waterstop section using a waterstop iron, comprising:
   a first support member configured to support the first waterstop section;
   a second support member configured to support the second waterstop section, said second support member being operatively coupled to said first support member and movable between:
      a loading configuration at which said first and said second support members are spaced apart to selectively allow respective first and second waterstop sections to be coupled to respective first and second support members;
      a heating configuration allowing the first and second waterstop sections to be simultaneously heated by the waterstop iron;
      a welding configuration allowing the first and second waterstop sections to be welded together after they have been heated by the waterstop iron; and
   a pair of die assemblies for selectively coupling respective first and second waterstop sections to said first and second support members, each die assembly having an upper portion removably coupled to a lower portion and configured to sandwich a respective waterstop section therebetween;
   wherein:
      each lower portion includes a lower framework having a fastener extending upwardly therefrom; and
      each upper portion includes an upper framework defining a vertical bore configured to selectively receive said fastener of a respective lower portion so as to selectively couple together said lower portion and said upper portion.

2. The mobile waterstop welding apparatus of claim 1, wherein each upper portion includes a second fastener removably coupled to a free end of said first fastener when said first fastener is received in said vertical bore so as to secure together said lower portion and said upper portion.

3. The mobile waterstop welding apparatus of claim 1, wherein:
   each lower framework of a respective lower portion includes an elongate lower framework side member extending longitudinally between opposed lower framework end members; and
   an upper surface of said lower framework side member defines a first alignment groove that is perpendicular to the longitudinal extent of said lower framework side member and is configured to receive an alignment flange of a respective waterstop.

4. The mobile waterstop welding apparatus of claim 3, wherein said upper surface of said lower framework side member defines a second alignment groove that is angled relative to the longitudinal extent of said lower framework side member and is configured to receive an alignment flange of a respective waterstop.

5. The mobile waterstop welding apparatus of claim 4, wherein:
   said upper surface of said lower framework side member defines a third alignment groove that is angled relative to the longitudinal extent of said lower framework side member and is configured to receive an alignment flange of a respective waterstop; and
   said second and said third alignment grooves are oppositely adjacent said first alignment groove and are angled away from said first alignment groove and toward said opposed lower framework end members of said lower framework.

6. The mobile waterstop welding apparatus of claim 5, wherein said second and third alignment grooves of said lower framework are situated at a 45 degree angle relative to the longitudinal extent of said lower framework side member.

7. The mobile waterstop welding apparatus of claim 1, wherein:
   each upper framework of a respective upper portion includes an elongate upper framework side member extending longitudinally between opposed upper framework end members; and
   a lower surface of said upper framework side member defines a first alignment groove that is perpendicular to the longitudinal extent of said upper framework side member and is configured to receive an alignment flange of a respective waterstop.

8. The mobile waterstop welding apparatus of claim 7, wherein said lower surface of said upper framework side member defines a second alignment groove that is angled relative to the longitudinal extent of said upper framework side member and is configured to receive an alignment flange of a respective waterstop.

9. The mobile waterstop welding apparatus of claim 8, wherein:
   said lower surface of said upper framework side member defines a third alignment groove that is angled relative to the longitudinal extent of said upper framework side member and is configured to receive an alignment flange of a respective waterstop; and
   said second and said third alignment grooves of said upper framework are oppositely adjacent said first alignment groove and are angled away from said first alignment groove and toward said opposed upper framework end members of said upper framework.

10. The mobile waterstop welding apparatus of claim 1, wherein a respective lower framework of a respective lower portion of a respective die assembly includes:
   a first retention handle operatively coupled to one end of said lower framework; and
   a first retention pin extending inwardly from said first retention handle, said first retention pin having a terminal end configured to engage one of said first and second support members, whereby coupling said lower portion of said respective die assembly to said one of said first and second support members.

11. The mobile waterstop welding apparatus of claim 10, wherein:
   said retention handle is selectively movable between a deployed configuration in which said terminal end of said retention pin is in contact with said one of said first and second support members and a released configuration in which said terminal end of said retention pin is displaced from said one of said first and second support members; and said retention pin is spring-loaded and configured to normally urge said retention handle toward said deployed configuration.

12. The mobile waterstop welding apparatus of claim 11, wherein a respective lower framework of a respective lower portion of a respective die assembly includes:
 a second retention handle operatively coupled to another end of said lower framework opposite said first retention handle; and
 a second retention pin extending inwardly from said second retention handle, said second retention pin having a terminal end configured to engage one of said first and second support members, whereby coupling said lower portion of said respective die assembly to said one of said first and second support members.

13. The mobile waterstop welding apparatus of claim 1, further comprising a track assembly operatively coupled to said first and second support members that is configured to guide said second support member as said second support member moves between respective loading, heating, and welding configurations.

14. The mobile waterstop welding apparatus of claim 13, further comprising a spring assembly operatively coupled to said first and second support members that is configured to urge the second waterstop section towards the first waterstop section when said second support member is in the welding configuration.

15. The mobile waterstop welding apparatus of claim 14, wherein said spring assembly includes:
 a first and third spring operatively coupled to said first support member and configured so as to urge said first and second support members towards the closed configuration;
 a second and fourth spring operatively coupled to said second support member and configured so as to urge said first and second support members towards the closed configuration;
 a first plunger in communication with said first and second springs; and
 a second plunger in communication with said third and fourth springs.

16. The mobile waterstop welding apparatus of claim 15, further comprising a damper assembly operatively coupling one of said first and second support members to said track assembly, said damper configured to slow a speed at which said spring assembly normally urges said first and second support members towards the closed configuration.

17. The mobile waterstop welding apparatus of claim 14, further comprising:
 a back plate coupled to said first and second support members; and
 a plurality of hanging members selectively coupled to said first and second support members.

18. The mobile waterstop welding apparatus of claim 13, comprising:
 a linkage assembly having a first linkage member coupled to said first support member and a second linkage member coupled to said second support member; and
 a handle coupled to said first and second linkage members of said linkage assembly, said handle and said first and second linkage members configured to guide said second support member as it moves between respective loading, heating, and welding configurations.

19. The mobile waterstop welding apparatus of claim 1, further comprising a back plate coupled to and displaced from said first and second support members.

\* \* \* \* \*